(12) United States Patent
Wei et al.

(10) Patent No.: US 9,535,411 B2
(45) Date of Patent: Jan. 3, 2017

(54) CLOUD ENABLED BUILDING AUTOMATION SYSTEM

(71) Applicants: Dong Wei, Edison, NJ (US); Florin Darie, Middletown, NJ (US); Kun Ji, Plainsboro, NJ (US); Zhen Song, Plainsboro, NJ (US)

(72) Inventors: Dong Wei, Edison, NJ (US); Florin Darie, Middletown, NJ (US); Kun Ji, Plainsboro, NJ (US); Zhen Song, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 381 days.

(21) Appl. No.: 13/916,871

(22) Filed: Jun. 13, 2013

(65) Prior Publication Data

US 2013/0274940 A1 Oct. 17, 2013

Related U.S. Application Data

(63) Continuation-in-part of application No. 13/763,870, filed on Feb. 11, 2013.
(Continued)

(51) Int. Cl.
*G05B 19/02* (2006.01)
*G05B 15/02* (2006.01)
*G06Q 50/06* (2012.01)

(52) U.S. Cl.
CPC .............. *G05B 19/02* (2013.01); *G05B 15/02* (2013.01); *G06Q 50/06* (2013.01); *G05B 2219/2642* (2013.01)

(58) Field of Classification Search
CPC .................................................... G06Q 50/06
See application file for complete search history.

(56) References Cited

U.S. PATENT DOCUMENTS 5,545,244 A * 8/1996 Hwang ................. G05B 17/02
 65/158
7,904,209 B2 * 3/2011 Podgorny et al. ............ 700/276
(Continued)

FOREIGN PATENT DOCUMENTS

EP 2325707 A1 5/2011
EP 2954377 A1 12/2015
(Continued)

OTHER PUBLICATIONS

PCT International Search Report mailed Apr. 3, 2014 corresponding to PCT International Application No. PCT/US2014/015520 filed Feb. 10, 2014 (10 pages).
(Continued)

*Primary Examiner* — Kenneth M Lo
*Assistant Examiner* — David Wynne

(57) ABSTRACT

A method of controlling energy consumption in a building. The method includes receiving occupant request data including a plurality of requests, wherein each of the plurality of requests corresponds to one of a plurality of zones in the building wherein the occupant request data is received via a cloud computing resource. The method also includes receiving weather data including at least one of current weather measurement data and weather forecast data wherein the weather data is received via a cloud computing resource. In addition, a facility management rule is received via a cloud computing resource. Further, the method includes generating a plurality of output control signals via cloud computing resource, wherein each of the plurality of output control signals is based on one of a plurality of requests and predicted occupant schedules, energy price data and the facility management rule. The control signals are generated by using simulation-based model predictive control method to determine a set of optimized control signals based on
(Continued)

optimized energy use or optimized energy cost. The optimized control signals are transmitted to controllers.

14 Claims, 9 Drawing Sheets

Related U.S. Application Data

(60) Provisional application No. 61/606,630, filed on Mar. 5, 2012.

(56) References Cited

U.S. PATENT DOCUMENTS

| | | | |
|---|---|---|---|
| 2007/0132572 A1* | 6/2007 | Itoh | B60K 35/00 340/462 |
| 2008/0209342 A1* | 8/2008 | Taylor | G05B 15/02 715/747 |
| 2008/0277486 A1* | 11/2008 | Seem et al. | 236/49.3 |
| 2009/0057425 A1* | 3/2009 | Sullivan | F24F 11/0009 236/51 |
| 2009/0240380 A1* | 9/2009 | Shah et al. | 700/295 |
| 2010/0025483 A1* | 2/2010 | Hoeynck et al. | 236/1 |
| 2010/0070089 A1* | 3/2010 | Harrod | F24F 11/0086 700/277 |
| 2010/0106810 A1* | 4/2010 | Grohman | 709/220 |
| 2010/0145917 A1* | 6/2010 | Bone et al. | 707/694 |
| 2011/0202185 A1* | 8/2011 | Imes et al. | 700/277 |
| 2012/0085832 A1* | 4/2012 | Thompson | 236/74 R |
| 2012/0179298 A1* | 7/2012 | Ha | 700/276 |
| 2012/0232701 A1* | 9/2012 | Carty et al. | 700/277 |
| 2012/0235579 A1* | 9/2012 | Chemel et al. | 315/152 |
| 2013/0013121 A1* | 1/2013 | Henze | G06Q 10/04 700/291 |
| 2013/0035794 A1* | 2/2013 | Imani | 700/276 |
| 2013/0035799 A1* | 2/2013 | Song | H04L 12/282 700/291 |
| 2013/0133023 A1* | 5/2013 | Burstein et al. | 726/1 |
| 2013/0144451 A1* | 6/2013 | Kumar et al. | 700/291 |
| 2013/0151012 A1* | 6/2013 | Shetty et al. | 700/276 |
| 2013/0274940 A1 | 10/2013 | Darie | |
| 2014/0158783 A1* | 6/2014 | Fan et al. | 236/1 |
| 2014/0163759 A1* | 6/2014 | Anderson | G06Q 50/06 700/291 |
| 2014/0277763 A1* | 9/2014 | Ramachandran et al. | 700/276 |
| 2014/0280955 A1* | 9/2014 | Stuntebeck et al. | 709/226 |
| 2014/0316586 A1* | 10/2014 | Boesveld et al. | 700/278 |

FOREIGN PATENT DOCUMENTS

| | | |
|---|---|---|
| WO | 2011106918 A1 | 9/2011 |
| WO | WO 2014124353 A1 | 8/2014 |

OTHER PUBLICATIONS

Report of Examination mailed Apr. 8, 2016; Application No. 2900767; Filing Date: Feb. 10, 2014; 5-pages.
Report of Examination mailed Aug. 2, 2016; Canadian Application No. 2900767; Filing Date: Feb. 10, 2014; 7-pages.

* cited by examiner

CLOUD ENABLED BUILDING AUTOMATION SYSTEM

CROSS REFERENCE TO RELATED APPLICATION

This application is a continuation-in-part application of U.S. application Ser. No. 13/763,870 filed on Feb. 11, 2013 entitled SYSTEM AND METHOD OF ENERGY MANAGEMENT CONTROL which claims the benefit under 35 U.S.C. 119(e) of U.S. Provisional Application No. 61/606,630 filed on Mar. 5, 2012 wherein both applications are hereby incorporated by reference in their entirety.

FIELD OF THE INVENTION

This invention to energy management control, and more particularly, to a cloud enabled energy management control framework to provide optimized control and operation for energy efficient buildings.

BACKGROUND OF THE INVENTION

Many current building automation systems use reactive control strategies to monitor and control various systems in a building. For example, the strategies may include following schedules and settings created by a facility manager. Referring to FIG. 1, an architecture 10 for a reactive building automation system is shown. The building includes a facility manager workstation 28 which includes a human machine interface (HMI) 32, data logger 34 and provides access to a manufacturing execution system (MES) 36. In addition, the building includes an engineering workstation 30 which provides access to an engineering system (ES) 38. The building automation system includes controllers 12 associated with actuators 14 and sensors 22 for water heaters/chillers, hot/chilled water pumps, temperature meters 16, water and/or air supply valves, flow meters 18, ventilation fans, humidifiers, thermal mass meters, flow meters 20, lights, circuit breakers, electricity meters 24 and ventilators, carbon dioxide ($CO_2$) meters, luminance meters 26 and other devices and/or sensors. The controllers 12 provide close-loop and open-loop control of environmental conditions such a temperature, humidity, air quality and others. Each controller 12 receives temperature, humidity, luminance and other settings, along with schedules of settings, which are input to the MES 36 by a facility manager via the HMI 32. Real-time data, such as temperature, humidity, and luminance, is collected by the controllers 12 and sent to the HMI 32 and the data logger 34. The facility manager also monitors real-time status of the building and reads historical data from the data logger 34. Further, the ES 38 is used by an engineer to program, monitor, troubleshoot and commission the building automation system 10, controllers 12, HMI 32, and data logger 34.

However, such strategies do not consider changes in energy prices, such as the price of electricity, which occur at different times and for different weather conditions. Thus, such systems are not cost effective or energy efficient. Another disadvantage is that occupants in the building may not be able to control their own environment settings. For instance, some occupants prefer 72° F. in summer time, and others prefer 75° F.

SUMMARY OF THE INVENTION

A method of controlling energy consumption in a building is disclosed. The method includes receiving occupant request data comprising a plurality of requests, wherein each of the plurality of requests corresponds to one of a plurality of zones in the building wherein the occupant request data is received via a cloud computing resource. The method also includes receiving weather data comprising at least one of current weather measurement data and weather forecast data wherein the weather data is received via a cloud computing resource. In addition, a facility management rule, created and managed by the facility manager, is received via a cloud computing resource. Further, the method includes generating a plurality of output control signals via cloud computing resource, wherein each of the plurality of output control signals is based on one of a plurality of requests and predicted occupant schedules, energy price data and the facility management rule. The control signals are simulated to determine an optimized control signal based on optimized energy use or optimized cost.

DESCRIPTION OF THE INVENTION

Figure 1:
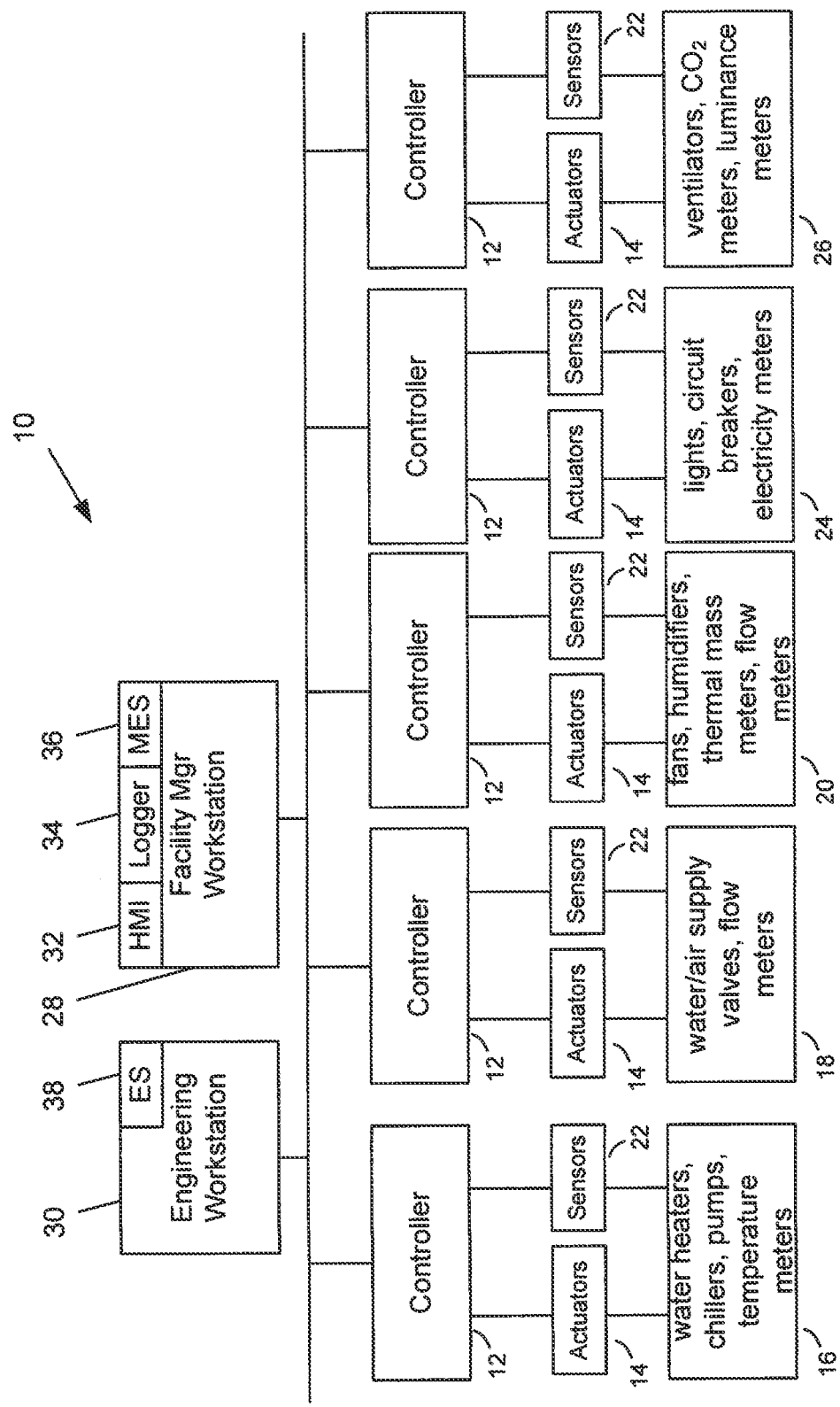
FIG. 1 depicts an architecture for a conventional reactive building automation system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-9.

According to exemplary embodiments of the present disclosure, an energy management control (EMC) system is utilized to permit a building automation system (BAS) to utilize different, externally available information to proactively control, and optimize energy management. A BAS is a system used by the control system of a building to monitor and control various systems in the building. For example, a BAS communicates with building control devices in the building to manage the energy consumption in the building. The types of information utilized by the EMC system include, for example, weather information, occupancy information, and energy market price information. By integrating this available, useful information, energy consumption may be decreased, and occupant comfort may be increased in a building.

Figure 2:
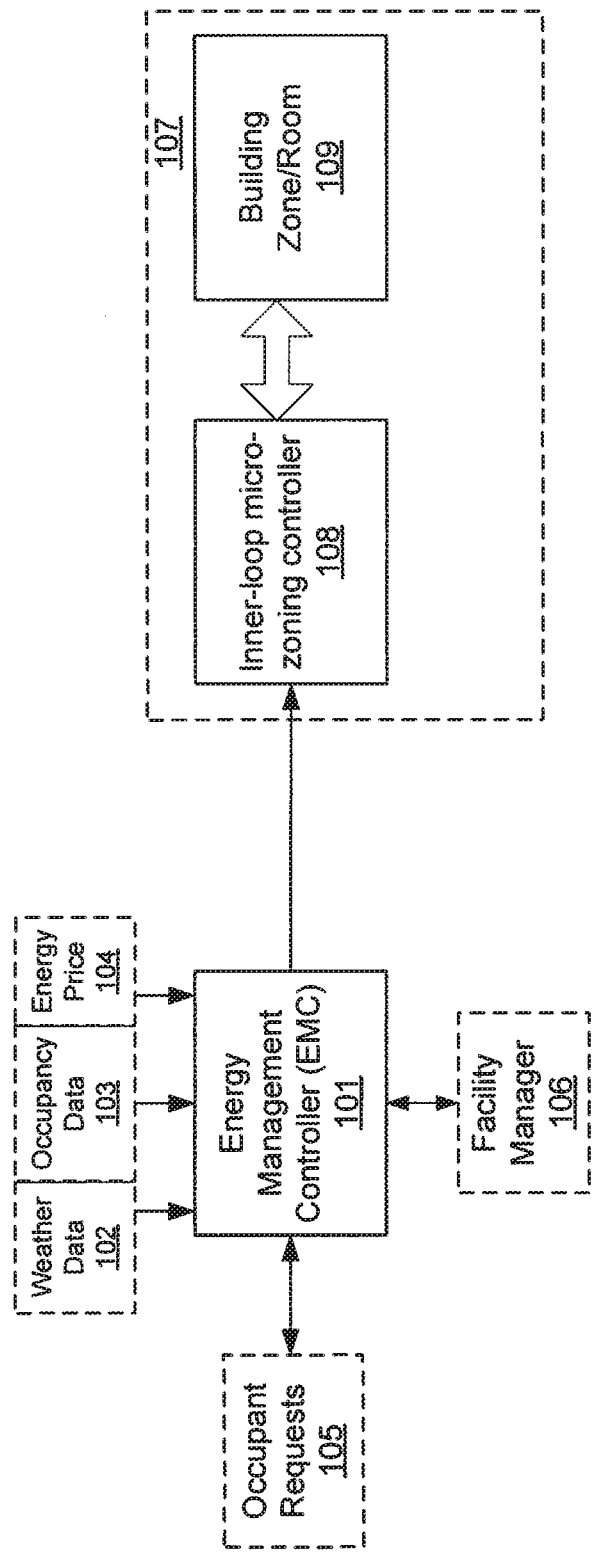
FIG. 2 shows an energy management control (EMC) system, according to an exemplary embodiment of the present disclosure.

FIG. 2 shows an energy management control (EMC) system 100, according to an exemplary embodiment of the present disclosure. In FIG. 2, an energy management controller 101 receives data, including, for example, weather data 102, occupancy data 103, and energy price data 104. The weather data may include current weather measurement data (e.g., the current temperature) and weather forecast data (e.g., a prediction of the temperature over an upcoming time period). The occupancy data may include occupant request data and occupant schedule data. The occupant request data is data input by an occupant, and corresponds to a current request made by the occupant. For example, an occupant may request that the temperature in a zone in the building be set to a specific temperature value. The occupant schedule data is data reflecting a predicted occupant schedule for a building. For example, a building may include different zones, and each zone may have corresponding occupant schedule data. The occupant schedule data may be based on a prediction of the number of occupants that will be present in certain zones of the building at certain times, as well as certain tasks, which require certain levels of energy consumption, that are scheduled to be performed in certain zones of the building at certain times. Energy price data may include current energy price data (e.g., a real-time energy price) and/or predicted energy price data for future time periods provided by an energy utility or a plurality of energy utilities. A zone in the building may correspond to a single room in the building, or to an area in the building including several rooms.

The data may be input to the energy management controller 101 via a variety of means, and is used by the EMC system 100 for optimal planning and operation of the BAS. For example, in an exemplary embodiment, the EMC system 100 may include input means such as, for example, a touchscreen, a keyboard, a mouse, etc., and a user can manually input the different types of data. In an exemplary embodiment, the EMC system 100 may retrieve the data from a database, or a plurality of databases. The database(s) may be located separately from the EMC system 100, and the EMC system 100 may communicate with the database(s) via a network connection (e.g., a wired connection or a wireless connection). The data may be received automatically or manually by a user. For example, a user may set a schedule regarding the frequency at which the data is retrieved. In addition, the EMC system 100 may receive occupant requests at block 105 and rules from a facility manager at block 106. Based on the received data and input received from an occupant and/or a facility manager, the EMC system 100 outputs control signals. The output control signals may include, for example, set-points of zone temperature, humidity, and luminance, and schedules of building control devices such as, for example, a thermostat, HVAC (heating, ventilation and air conditioning), windows, and lights.

During operation, the EMC system 100 may implement a dual-loop structure. For example, the EMC system 100 may utilize an inner loop and an outer loop. The inner loop is shown at block 107 of FIG. 2, and enables micro-zoning and performs local optimization of the building control devices (block 108) (e.g., HVAC, lighting, windows, etc.) within the building used to comply with the set-point requirements output by the EMC system 100. That is, the inner loop enables independent control of low level building control devices (block 108) in individual zones in the building (block 109). A zone in the building may correspond to a single room in the building, or to an area in the building including several rooms. Micro-zoning refers to individually managing different building control devices in different zones of the building to optimize energy consumption in the building. An energy consumption profile may be transmitted from the inner loop to the energy management controller 101, allowing the energy management controller 101 to make adjustments to the output control signal transmitted to the inner loop. The output control signal may include, for example, set-points, modes, and schedules. The outer loop functions as a control loop for the main framework of the EMC system 100, serving as a high level strategy planner, enabling the BAS to perform a variety of functions. For example, the outer loop may enable the BAS to utilize data including, for example, weather data 102, occupancy data 103, and energy price data 104 to configure an energy saving strategy and implement the strategy in real-time. The outer loop may further enable the BAS to exploit the building's thermal storage capacity for load shaping, coordinate occupants' real-time requests for micro-zoning, plan natural ventilation and cooling, and predict 10 a daily energy demand profile for automatic demand response. The outer loop communicates with the inner loop via an interface module 205, as described with reference to FIG. 3.

Figure 3:
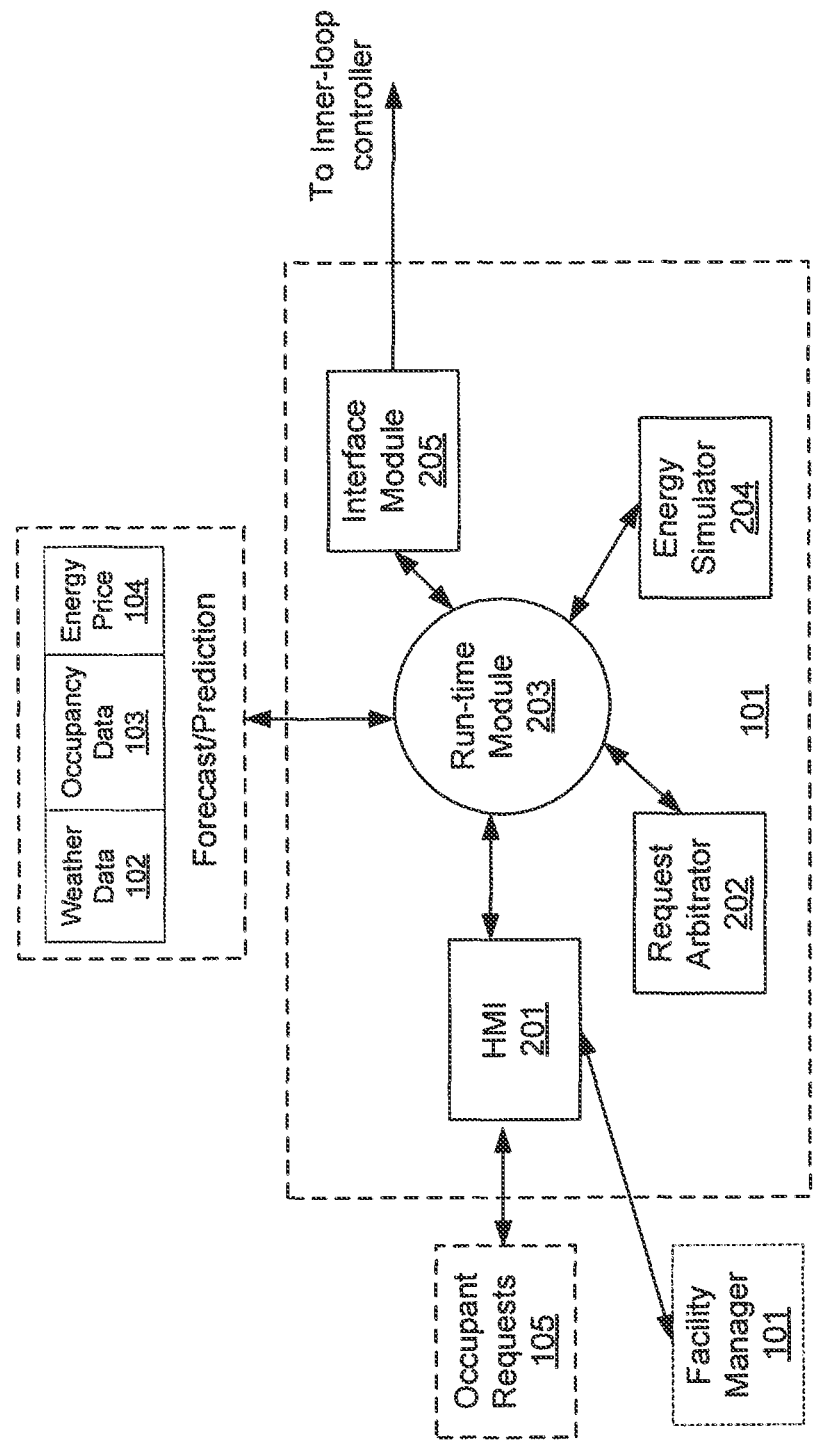
FIG. 3 shows the energy management controller of FIG. 1, according to an exemplary embodiment of the present disclosure.

FIG. 3 shows the energy management controller 101 of FIG. 1, according to an exemplary embodiment of the present disclosure. As shown in FIG. 3, the energy management controller 101 may include a number of components. A human-machine interface (HMI) 201 is utilized to communicate with occupants and the facility manager to receive requests (e.g., from the occupants) and rules (e.g., from the facility manager). The HMI 201 may aggregate the requests and rules to facilitate optimal planning and operation of the BAS. The HMI 201 may be implemented in a variety of manners. For example, the HMI 201 may be a dedicated web-based HMI, providing occupants with a convenient and easily accessible interface to control certain zones and rooms in the building. The web-based HMI may be accessed via any network connected device including, for example, a computer, a tablet computer, a smartphone, etc. The HMI 201 may include the capability of storing task schedules and preferences associated with the tasks. The facility manager may utilize the HMI 201 to receive information relating to the occupants' preferences, task schedules, and demand response request (e.g., a request from a utility company to reduce energy consumption during periods of high demand), allowing the facility manager to implement rules of operations and decisions during a demand response period (e.g., decreasing energy consumption).

A request arbitrator 202 receives requests input by the occupant and rules input by the facility manager, and implements the requests based on the rules. The requests that comply with the rules may be implemented by the EMC system 100. For example, if a user inputs a request that a temperature in a zone of a building be set to 75 degrees, and the rules input by the facility manager specify that the temperature stay within a range of 76 degrees and 78 degrees, the request arbitrator 202 will not implement the user's request since it is not in compliance with the rules. That is, in an exemplary embodiment, if a request is made that is not in compliance with the rules, the request is not implemented. Alternatively, if the request is not in compliance with the rules, the request arbitrator 202 may implement an alternate change based on the non-compliant request. For example, if a user inputs a request that a temperature in a zone of a building be set to 75 degrees, and the rules input by the facility manager specify that the temperature stay within a range of 76 degrees and 78 degrees, the request arbitrator 202 may set the temperature to the compliant value closest to the user's non-compliant request (e.g., in the present example, the request arbitrator 202 may set the temperature to 76 degrees). In this case, the request arbitrator 202 may generate a notification to be presented to the user, informing the user that his or her initial request was non-compliant, and informing the user that an adjustment was made based on the closest compliant value to the user's non-compliant request.

Figure 4:
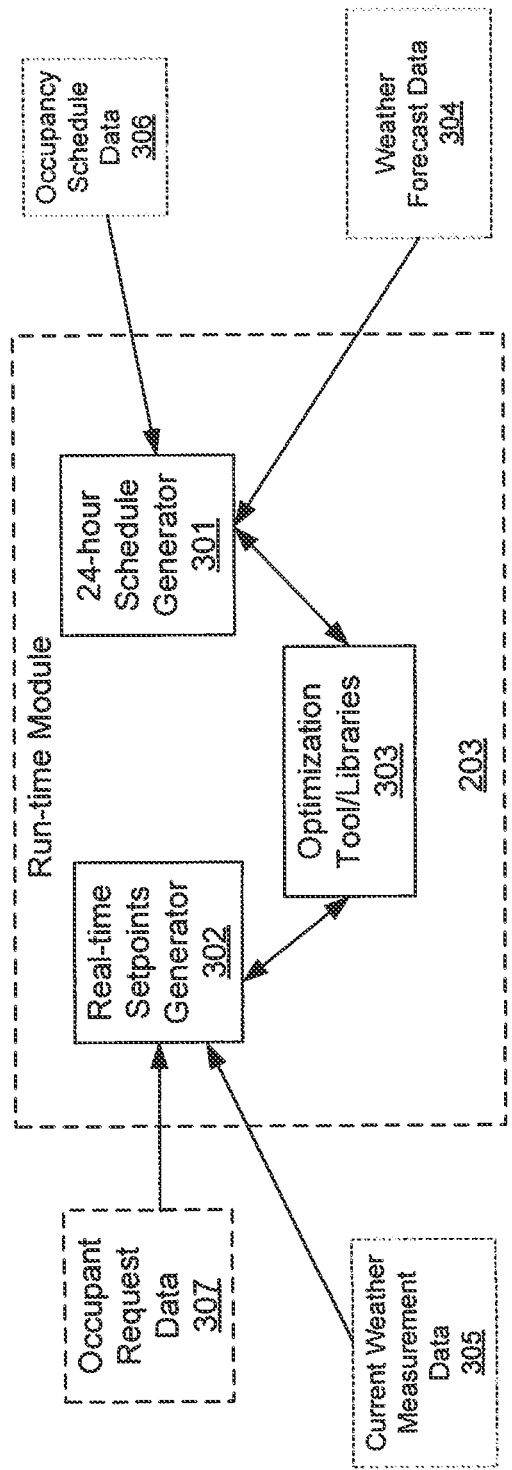
FIG. 4 shows the EMC run-time module of FIG. 3, according to an exemplary embodiment of the present disclosure.

FIG. 4 shows the EMC run-time module 203 of FIG. 3, according to an exemplary embodiment of the present disclosure. The EMC run-time module 203 generates EMC strategies based on input received by the EMC system 100. As described above, the input may include, for example, weather data 102, occupancy data 103, and energy price data 104. In an exemplary embodiment, the EMC run-time module 203 includes a default schedule generator 301, a real-time set-points generator 302, and an optimization tool/libraries module 303.

The default schedule generator 301 generates a default schedule including set-points for pre-determined intervals for every zone in the building. The default schedule corresponds to an optimal schedule as determined by the default schedule generator 301. The default schedule 10 generator 301 may be configured to generate a new schedule for any time interval. For example, the default schedule generator 301 may be configured to generate a new schedule every 24 hours, however the time interval is not limited thereto. Further, the pre-determined intervals for the set-points for every zone in the building may be customized. For example, set-points for each zone may be set to update every hour, however the intervals are not limited thereto. In addition, the 15 set-points for different zones and for different building control devices may be set to update at different intervals. For example, the temperature in a first and second zone may be set to update every 1 hour, the temperature in a third zone may be set to update every 3 hours, the lighting system in the first zone may be set to update every 8 hours, and the lighting system in the second and third zones may be set to update every 12 hours.

The default schedule generated by the default schedule generator 301 is based on certain weather data 102 and certain occupancy data 103. For example, the weather data 102 may include both weather forecast data 304 and current (e.g., real-time) weather measurement data 305, and the occupancy data 103 may include both occupant schedule data 306 (e.g., predicted or preferred occupant schedules and tasks including preferred office hours and meeting rooms) and occupant request data 307 (e.g., current requests made by an occupant(s) in real-time). The default schedule generator 301 may utilize the weather forecast data 304 and the occupant schedule data 306 to generate the default schedule. The default schedule generator 301 receives the occupant schedule data 306 from the HMI 201. This schedule may be used by the BAS as the default schedule. For example, the default schedule generated by the default schedule generator 301 may be applied to the BAS when no new real-time set-points are provided by the real-time set-points generator 302.

The real-time set-points generator 302 generates set-points based on the real-time occupant request data 307 and the real-time weather measurement data 305. For example, as the real-time set-points generator 302 receives requests from an occupant and receives real-time weather measurement data, the real-time set-points generator 302 generates set-points that override the default schedule generated by the default schedule generator 301. The EMC run-time module 203 may seamlessly transition between applying the default schedule to the BAS when no set-points have been generated by the real-time set points generator 302, and making 15 adjustments to the default schedule when occupant requests and/or real-time weather measurement data is received.

The default schedule generator 301 and the real-time set-points generator 302 may both utilize the optimization tool/libraries module 303 and an energy simulator 204 of the energy management controller 101 to perform optimization related simulation to determine optimal 20 schedules and set-points. For example, the optimization tool/libraries module 303 may be utilized to perform different types of optimization, including, for example, heuristic search based optimization, and may utilize the energy simulator 204 to implement the optimization process.

Referring to FIG. 3, the energy simulator 204 simulates different EMC strategies and determines which strategy is the most energy efficient. The energy simulator 204 may utilize existing energy simulation software such as, for example, EnergyPlus. The energy simulator 204 may communicate with the optimization tool/libraries module 303 of the EMC run-time module 203 to determine an optimized strategy. The energy simulator 204 may utilize characteristics of the building, which may be input by a user (e.g., the facility manager), to simulate different EMC strategies. The building characteristics may include, for example, the building's physical makeup, including the physical makeup of specific rooms and zones, a description of the different types and locations of building control devices in the building, etc.

The interface module 205 is a channel allowing the outer loop to communicate with the inner loop. Once an EMC strategy is determined and selected by the EMC system 100 in the outer loop, this strategy is communicated to the inner loop, and the inner loop applies the strategy via local optimization of the building control devices within the building.

Figure 5:
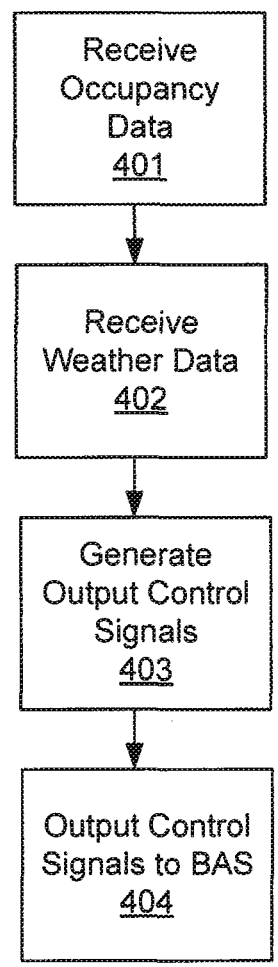
FIG. 5 is a flowchart showing a method of controlling energy consumption in a building, according to an exemplary embodiment of the present disclosure.

As described above, the EMC system 100 allows for the determination, simulation, and application of different EMC strategies, each of which may result in different energy/cost savings. FIG. 5 is a flowchart showing a method of controlling energy consumption in a building, according to an exemplary embodiment of the present disclosure. At block 401, occupancy data is received by the EMC system 100. The occupancy data may include occupant request data and/or occupant schedule data. As described above, the occupant request data may include a current request made by an occupant, and the occupant schedule data may include a predicted occupant schedule based on occupants in the building and tasks to be completed in the building. At block 402, weather data is received by the EMC system 100. As described above, the weather data may include current (e.g., real-time) weather measurement data and weather forecast data. At block 403, the EMC system 100 generates an output control signal. The output control signal is based on the received occupancy data and weather data, and is configured to adjust a building control device in a zone in the building. At block 404, the output control signal is transmitted to the BAS.

Figure 6:
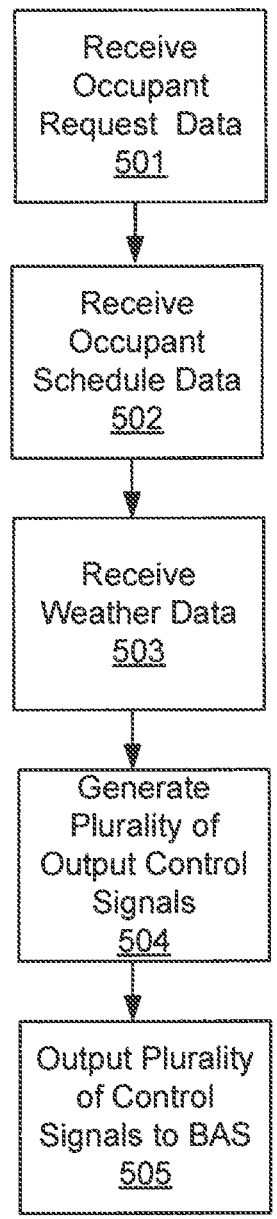
FIG. 6 is a flowchart showing a method of controlling energy consumption in a building, according to an exemplary embodiment of the present disclosure.

FIG. 6 is a flowchart showing a method of controlling energy consumption in a building, according to an exemplary embodiment of the present disclosure. At block 501, occupant request data is received by the EMC system 100. The occupant 15 request data may include a plurality of requests, each of which correspond to one of a plurality of zones in the building. At block 502, occupant schedule data is received by the EMC system 100. The occupant schedule data may include a plurality of predicted occupant schedules, each of which corresponds to one of the plurality of zones in the building. At block 503, weather data is received by the EMC system 100. The weather data may include current weather measurement data and/or weather forecast data. At block 504, a plurality of output control signals are generated by the EMC system 100. Each of the plurality of output control signals is based on one of the plurality of requests and one of the plurality of predicted occupant schedules, and each of the output control signals is configured to adjust building control devices in the plurality of zones in the building. At block 505, the output control signals are transmitted to the BAS. As a result, micro-zoning may be performed.

According to an exemplary embodiment, an occupancy based control strategy may be implemented by the EMC system 100. The occupancy based control strategy is based on the occupancy data 103, and utilizing different set-points based on the occupancy data 103. For example, the occupancy data 103 may indicate an occupancy schedule, as well as occupancy requests/preferences. The occupancy schedule includes information indicating at which times different zones in the building are typically occupied and unoccupied, and may also indicate the different tasks performed in the different zones at certain times. A zone may correspond to a single room in the building, or to multiple rooms in a certain area of the building. In addition to the occupancy schedule, occupancy requests/preferences may be included in the occupancy data 103. Occupancy requests/preferences include requests input to the EMC system 100 by user(s). For example, a user may request that a temperature of a certain zone be increased during certain times of day, or on different days. If this request complies with rules set by the facility manager, as described above, additional set-points may be implemented by the EMC system 100. For example, using the occupancy based control strategy, basic set-points may be initially implemented based on the occupancy schedule. Additional set-points may then be implemented based on occupant preferences and requests.

According to an exemplary embodiment, a knowledge based control strategy (e.g., an occupancy task based control strategy) may be implemented by the EMC system 100. The occupancy based control strategy is based on the occupancy data 103 received from a user(s). For example, the occupancy data 103 may indicate an occupancy schedule, as well as occupancy task information. The occupancy schedule includes information indicating at which times the building is typically occupied and unoccupied. Further, the occupancy schedule may include information indicating at which times certain zones in the building are typically occupied and unoccupied. A zone may correspond to a single room in the building, or to multiple rooms in a certain area of the building. In addition to the occupancy schedule, occupancy task information may be included in the occupancy data 103. Occupancy task information indicates specific tasks 5 being carried out in specific zones of the building. For example, tasks may indicate computer usage, laboratory usage, heavy reading, etc. Based on this information, set-points may be implemented to adjust the lighting in specific zones of the building based on the tasks being carried out in those zones.

According to an exemplary embodiment, a weather based control strategy may be implemented by the EMC system 100. The weather based control strategy is a supplemental control strategy that can supplement any of the control strategies according to exemplary embodiments of the present disclosure. For example, the weather based control strategy may be implemented together with any of the time of day control strategy, the occupancy based control strategy, and the knowledge based control strategy. When the weather based control strategy is utilized, the EMC system 100 receives weather data 102 as an additional input, and uses this additional data to implement set-points. As a result, the current weather can be leveraged to increase energy consumption savings, as described above.

According to an exemplary embodiment, a load shifting control strategy may be implemented by the EMC system 100. The load shifting control strategy limits energy consumption during peak load time. Utilization of the load shifting control strategy may result in the savings of energy cost. That is, the load shifting control strategy may reduce the total energy cost by shifting the load to a time period having a cheaper energy price. For example, the load 10 shifting control strategy includes pre-cooling or pre-heating zones of a building prior to the peak load time. A heuristic search based optimization process may be implemented to determine the optimal start time and the duration of the pre-cooling or pre-heating. An energy cost function may be defined as the sum of demand cost and energy consumption cost. The heuristic search based optimization process may utilize, for example, Particle Swamp Optimization (PSO) or a Genetic Algorithm (GA).

It is to be understood that exemplary embodiments of the present disclosure may be implemented in various forms of hardware, software, firmware, special purpose processors, or a combination thereof. In one embodiment, a method for energy management control may be implemented in software as an application program tangibly embodied on a computer readable storage medium or computer program product. As such, the application program is embodied on a non-transitory tangible media. The application program may be uploaded to, and executed by, a processor comprising any suitable architecture.

It should further be understood that any of the methods described herein can include an additional step of providing a system comprising distinct software modules embodied on a computer readable storage medium. The method steps can then be carried out using the distinct software modules and/or sub-modules of the system, as described above, executing on one or more hardware processors. Further, a computer program product can include a computer readable storage medium with code adapted to be implemented to carry out one or more method steps described herein, including the provision of the system with the distinct software modules.

Figure 7:
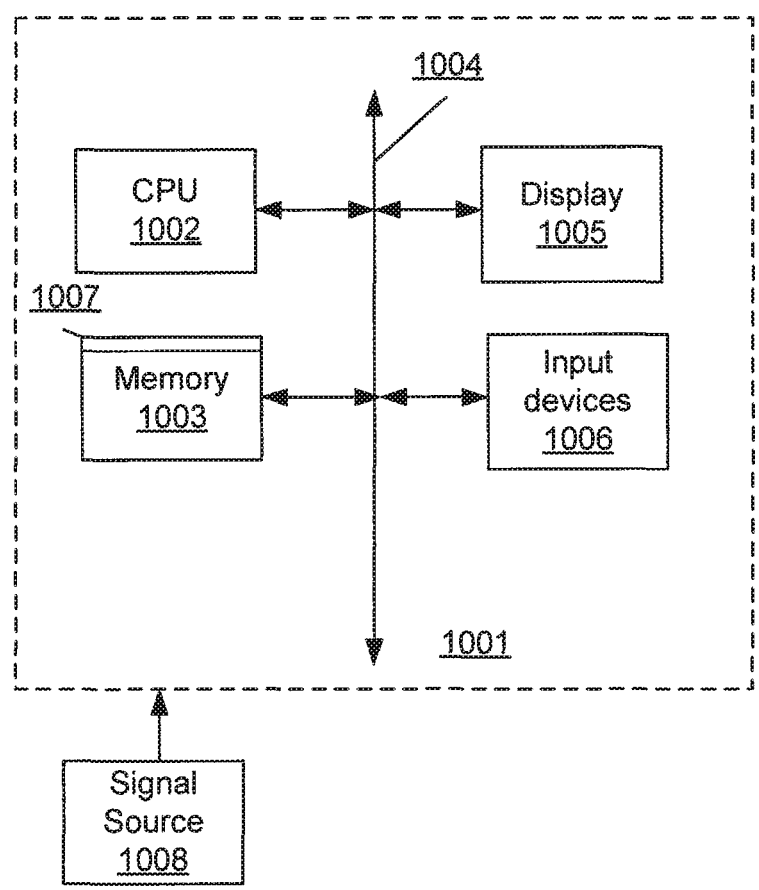
FIG. 7 shows an exemplary computer system for implementing an EMC system, according to an exemplary embodiment of the present invention.

Referring to FIG. 7, according to an exemplary embodiment of the present disclosure, a computer system 1001 for energy management control can comprise, inter alia, a central processing unit (CPU) 1002, a memory 1003 and an input/output (I/O) interface 1004. The computer system 1001 is generally coupled through the I/O interface 1004 to a display 1005 and various input devices 1006 such as a mouse and keyboard. The support circuits can include circuits such as cache, power supplies, clock circuits, and a communications bus. The memory 1003 can include random access memory (RAM), read only memory (ROM), disk drive, tape drive, etc., or a combination thereof. The present invention can be implemented as a routine 1007 that is stored in memory 1003 and executed by the CPU 1002 to process the signal from the signal source 1008. As such, the computer system 1001 is a general-purpose computer system that becomes a specific purpose computer system when executing the routine 1007 of the present invention. The computer system 1001 can communicate with one or more networks such as a local area network (LAN), a general wide area network (WAN), and/or a public network (e.g., the Internet) via a network adapter. In addition the computer system 1001 may be used as a server as part of a cloud computing system where tasks are performed by remote processing devices that are linked through a communications network. In a distributed cloud computing environment, program modules may be located in both local and remote computer system storage media including memory storage devices.

The computer platform 1001 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device. Examples of well-known computing systems, environments, and/or configurations that may be suitable for use with computer system 1001 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 8:
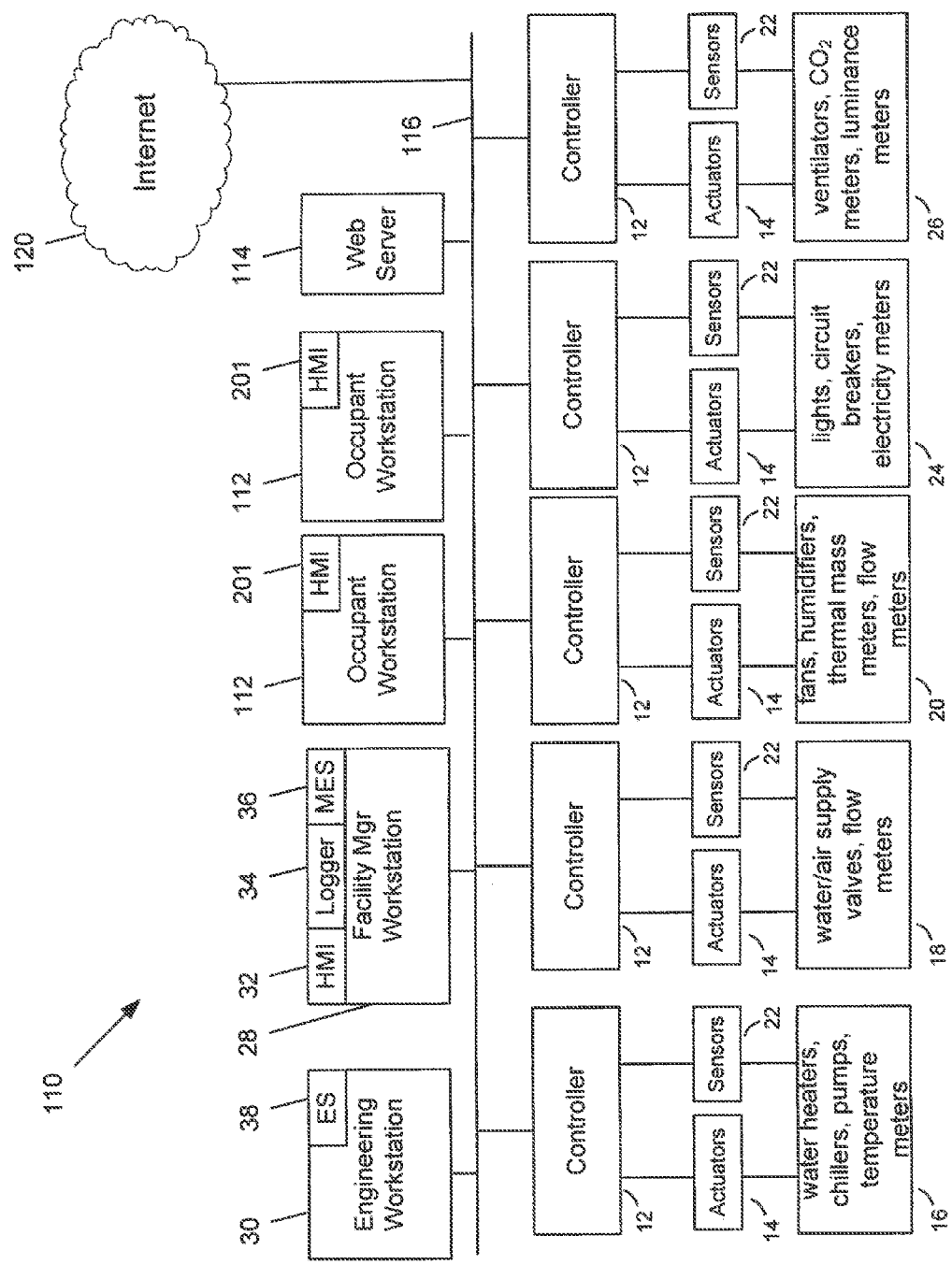
FIG. 8 depicts an architecture for the EMC system used in conjunction with a building automation system.

Referring to FIG. 8, an architecture 110 for the EMC system 100 used in conjunction with a BAS is shown. The architecture 110 includes occupant workstations 112 having the HMI 201, a web server 114 along with the engineering workstation 30 and facility manager workstation 28. The occupant workstations 112, engineering workstation 30, facility manager workstation 28, first web server 114 and controllers 12 are connected by a network 116. In use, the facility manager creates facility manager data 106 which includes, for example, rules for temperature, humidity, luminance and other settings via HMI 201. Occupants create occupancy data 103 such as schedules (for example, when the occupant will be in and out of office) and preferences for temperature, humidity, luminance and other settings. The schedules and preferences are then saved to the first web server 114. According to an exemplary embodiment, a time of day control strategy may be implemented by the EMC system 100. The time of day control strategy is based on a business hours schedule in which fixed set-points are utilized during business hours. For example, if typical business hours for a building are defined as 9:00 am to 5:00 pm, fixed set-points increasing energy use may be implemented at the start of the business day (e.g., 9:00 am), and fixed set-points decreasing energy use may be implemented at the end of the business day (e.g., 5:00 pm). The time of day control strategy is not limited to business hours. For example, the time of day strategy may be utilized in a home setting using different, fixed set-points utilized during different hours (e.g., hours corresponding to the typical time occupants' are at home).

The EMC system 100 receives the occupancy data 103, facility manager data 106 and energy price data 104 along with associated historical data, and a physical makeup or model of an associated building from the first web server 114. By way of example, the energy price data 104 may include electricity prices and historical data for the electricity prices. The EMC system 100 also receives weather data 102 which includes the weather forecast data 304 and current (e.g., real-time) weather measurement data 305, from the Internet 120. The EMC system 100 then generates multiple schedules for optimization. Energy simulation software such as EnergyPlus and TRNSYS, or energy simulation software developed via MATLAB, is then used by the energy simulator 204 to compute energy consumption and cost for each generated schedule. The EMC system 100 then sends the most suitable schedule in terms of optimized energy consumption and cost to the controllers 12. Thus, the EMC system 100 provides a proactive and predictive control strategy.

The EMC system 100 performs an optimization calculation once per day with given weather data 102, facility manager data 106, occupant data 103, energy price data 104 and building modeling data. The EMC system 100 calculates energy consumption and cost for multiple schedules (for example 10 schedules), whose granularity could be hour, 30 minutes and even 15 minutes, perhaps by using different energy simulation software tools. The EMC system 100 provides a proactive control strategy wherein an optimized schedule is generated that is based on prior knowledge of building physical model, weather forecast information, occupant schedule data and multiple schedules of settings.

Figure 9:
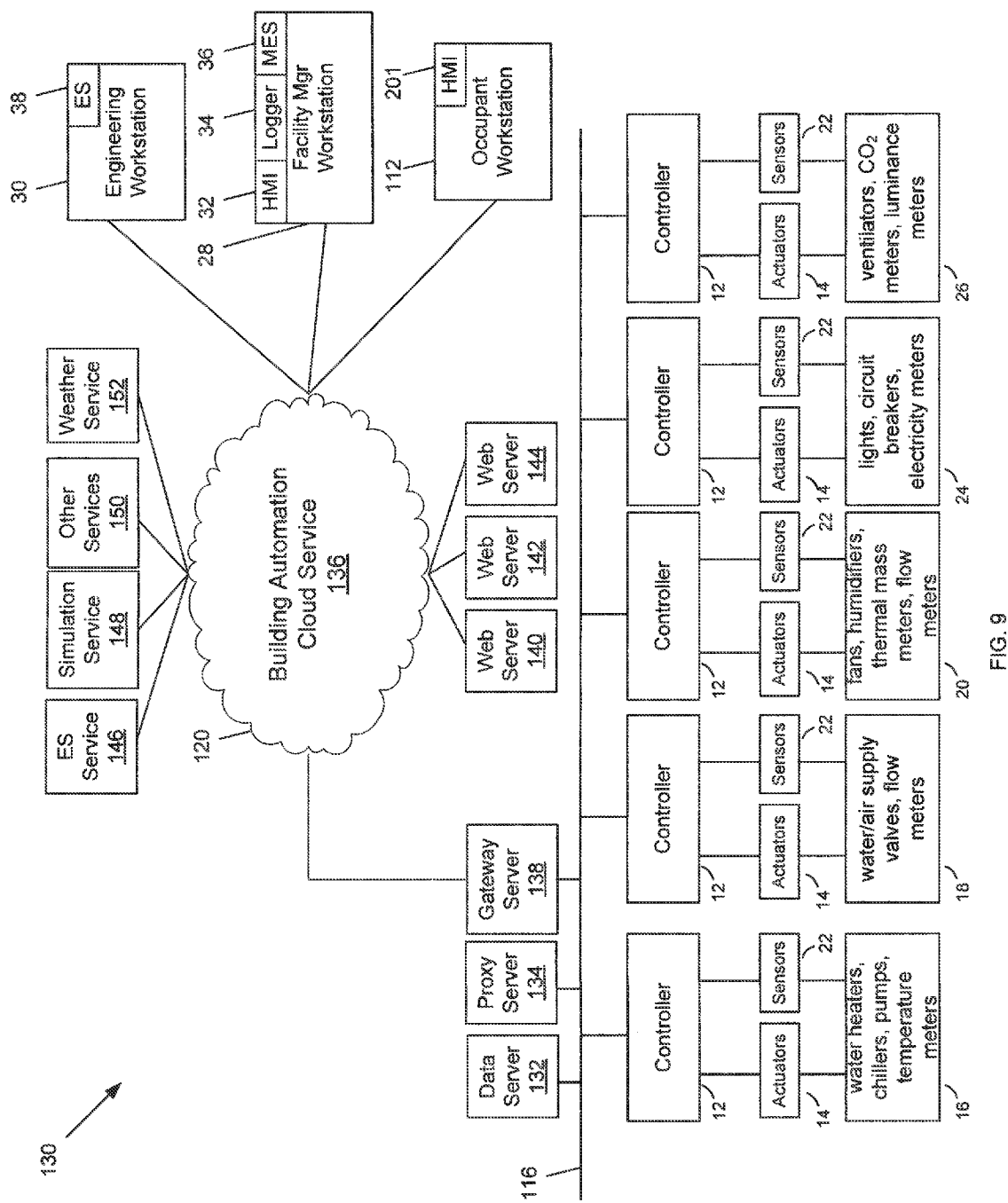
FIG. 9 is an alternate architecture for the EMC system when used in a cloud-enabled building automation system in accordance with the current invention.

In an embodiment, the current invention is configured to operate in a cloud computing environment. Cloud computing provides access to computing resources such as networks, network bandwidth, servers, processing, memory, storage, applications, virtual machines, services, software and others that reside on the Internet 120. Referring to FIG. 9, an alternate architecture 130 for the EMC system 100 when used in a cloud-enabled building automation system in accordance with the invention is shown. The architecture 130 includes a data server 132 that stores historical data, building modeling data, location information, rule setting by the facility manager, energy price plan, occupant preferences and schedules, default schedules and settings. In addition, the data server 132 stores sensor and actuator data collected by the controllers 12 which also form part of the inner loop. By way of example, the sensor data may include information such as a temperature reading and the actuator data may include information regarding activation of a fan or the speed of the fan. In addition, the architecture 130 includes a cloud-enabled proxy server 134 which runs default schedules and settings if cloud computing resources are not available. Further, the architecture 130 includes a cloud based building automation service (CBAS) 136 that is available over the Internet 120 as part of a cloud computing environment. Cloud computing resources, for example a computer system/server, are used to run the CBAS 136. The CBAS 136 communicates with a cloud-enabled gateway server 138 that collects all local data, such as data from date server 132, and negotiates with the CBAS 136 and receives optimized schedules and settings from CBAS 136. Another function of the gateway server 138 is to separate building control system, controllers 12 and the data server 132, from the Internet 120, which connects cloud service, occupants, service providers' applications, etc.

Occupants can create and modify their schedules and preferences via a web server 140 provided by the CBAS 136. In addition, the facility manager can monitor meters, sensors 22 and actuators 14 of the building create and modify schedules and rules via another web server 142 provided by the CBAS 136. Further, engineers can program, troubleshoot and commission the automation systems via an engineering system (ES) server 144 provided by the CBAS 136. Note that servers 140, 142 and 144 are independent servers logically. The servers 140, 142 and 144 can run on one computer physically, or run on different virtual machines provide by the cloud service provider. An ES service 146 for monitoring the building, a simulation service 148 for providing access to energy simulation software such as EnergyPlus and TRNSYS or energy simulation software developed via MATLAB to compute energy consumption, and other services 150, such as continuous commissioning services for optimizing energy use for existing buildings and demand response services for managing energy usage in response to supply conditions, may each be provided by a network host. Alternatively, the ES service 146, simulation service 148 and other services 150 may be provided via an internet based subscription service that charges a fee for each use. Similarly, the CBAS 136 may provide access to an internet based weather service 152. The CBAS 136 generates optimized schedules and settings in terms of energy usage and cost based on occupant data, facility manager setting rules, building modeling data, energy price and weather forecast data.

The CBAS 136 provides an interface for occupants to create their own preferences and schedules. In addition, the CBAS 136 provides an interface for the facility manager to monitor building information, such as temperature and humidity, and create rules and schedules and settings and to obtain historical data. Further, the CBAS 136 provides an interface for an engineer to access the ES service 146 to program, monitor, troubleshoot and commission controllers 12. The CBAS 136 may be accessed over the Internet 120 via a web browser by an engineer, facility manager or an occupant via the engineering 30, facility manager 28 and occupant 112 workstations, respectively, wherein the workstations may be either a desktop or mainframe computing device, a mobile computing device such as a laptop computer or a hand held computer and combinations thereof. The CBAS 136 provides proactive control to improve energy efficiency and reduce energy cost.

In accordance with the invention, ownership of ES service and simulation software is not required. Instead, users are charged per use, thus reducing costs. Further, use of cloud resources provides additional computational power that facilitates simulation of energy use. In addition, the architecture 130 provides additional scalability since additional simulation tools such as EnergyPlus, TRNSYS and MATLAB may be used. Further, additional scalability enables the generation and comparison of additional schedules and settings. In addition, the ES service 146 and simulation tools provided via the simulation service 148 can be used for multiple buildings, thus increasing the utilization of such services and tools.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present invention.

Having described exemplary herein, it is noted that modifications and variations can be made by persons skilled in the art in light of the above teachings. It is therefore to be understood that changes may be made in exemplary embodiments of the disclosure, which are within the scope and spirit of the invention as defined by the appended claims. Having thus described the present disclosure with the details and particularity required by the patent laws, what is claimed and desired protected by Letters Patent is set forth in the appended claims.

What is claimed is:

1. A method of controlling energy consumption in a building, comprising:

receiving occupant request data comprising a plurality of requests, wherein each of the plurality of requests corresponds to one of a plurality of zones in the building wherein the occupant request data is received via a cloud computing resource wherein the occupant request data includes an initial request received from an occupant of the building and wherein the initial request is associated with at least one initially requested environmental condition;

receiving occupant schedule data comprising a plurality of predicted occupant schedules, wherein each of the plurality of predicted occupant schedules corresponds to one of the plurality of zones in the building wherein the occupant request data is received via a cloud computing resource;

receiving weather data comprising at least one of current weather measurement data and weather forecast data wherein the weather data is received via a cloud computing resource;

receiving energy price data comprising at least one of current energy price data and predicted energy price data via a cloud computing resource;

receiving sensor and actuator data comprising data collected by controllers located in the building wherein the sensor and actuator data is received via a cloud computing resource;

receiving a facility management rule via a cloud computing resource;

generating a plurality of output control signals wherein each of the plurality of output control signals is based on one of the plurality of requests, one of the plurality of predicted occupant schedules, the energy price data and the facility management rule and each of the plurality of output control signals is configured to adjust building control devices in the plurality of zones in the building wherein the output control signals are generated via a cloud computing resource;

simulating each of the control signals via a cloud computing resource to determine an optimized control signal based on optimized energy use, optimized cost and building configuration information input by a building operator;

determining whether the initial request complies with the facility management rule; and transmitting the optimized output control signal to a building automation system (BAS) of the building when the initial request complies with the facility management rule such that the BAS provides the at least one environmental condition associated with the initial request, wherein when the initial request does not comply with the facility management rule, the BAS provides a closest value for the environmental condition, relative to the initially requested environmental condition, that complies with the facility management rule and wherein a user making the request is informed that the value for the environmental condition associated with the initial request was adjusted to the closest value for the environmental condition that complies with the facility management rule.

2. The method of claim 1, further comprising:
determining a peak energy load time based on the energy price data, wherein the output control signal is further configured to pre-cool or pre-heat the building during a time that does not correspond to the peak energy load time.

3. The method of claim 1, further comprising:
generating a notification indicating that the current request does not comply with the facility management rule upon determining that the current request does not comply with the facility management rule.

4. The method of claim 1, wherein the occupant request data includes a preferred temperature.

5. The method of claim 1, wherein the occupant schedule data includes preferred office hours, meeting rooms and schedules.

6. The method of claim 1, wherein the output control signal comprises a set-point corresponding to a target temperature and the building control device is a thermostat.

7. The method of claim 1, wherein the output control signal comprises a set-point corresponding to a target luminance value and the building control device is a lighting system.

8. The method of claim 1, further comprising:
setting a schedule for receiving at least one of the occupancy data, the weather data, and the energy price data.

9. The method of claim 1, wherein at least one of the occupancy data, the weather data, and the energy price data are received from a remote database.

10. A method of controlling energy consumption in a building, comprising:
providing a run-time module configured to receive occupant schedule data comprising a predicted occupant schedule, and weather data comprising at least one of current weather measurement data and weather forecast data wherein the occupant schedule data and weather forecast data are provided by a cloud computing resource;
providing a human-machine interface (HMI) configured to receive occupant request data comprising a current request wherein the occupant request data includes an initial request received from an occupant of the building and wherein the initial request is associated with at least one initially requested environmental condition;
simulating each of the control signals via a cloud computing resource to determine a simulated signal based on optimized energy use, optimized cost and building configuration information input by a building operator;
determining whether the initial request complies with a facility management rule; and
providing an interface module configured to receive an output control signal from the run-time module and transmit the output control signal to a building automation system (BAS) of a building, wherein the output control signal is based on the occupant schedule data, the weather data, the occupant request data, and the simulated signal, and wherein when the initial request complies with the facility management rule the BAS provides the at least one environmental condition associated with the initial request, and wherein when the initial request does not comply with the facility management rule, the BAS provides a closest value for the environmental condition, relative to the initially requested environmental condition, that complies with the facility management rule and wherein a user making the request is informed that the value for the environmental condition associated with the initial request was adjusted to the closest value for the environmental condition that complies with the facility management rule.

11. The method of claim 10, further comprising:
receiving energy price data including at least one of current energy price data and predicted energy price data wherein the output control signal is further based on the energy price data.

12. The method of claim 11, further comprising:
determining a peak energy load time based on the energy price data, wherein the output control signal is further configured to pre-cool or pre-heat the building during a time that does not correspond to the peak energy load time.

13. The method of claim 10, further comprising:
generating a notification indicating that the current request does not comply with the facility management rule upon determining that the current request does not comply with the facility management rule.

14. The method of claim 10, wherein the output control signal comprises a set-point corresponding to a target temperature and the building control device is a thermostat.

* * * * *